M. SUWA.
ELECTRIC BELL.
APPLICATION FILED JULY 3, 1915.

1,222,159.

Patented Apr. 10, 1917.

Witnesses.
Den Kido.
Eishiro Abe.

Inventor.
Michisuye Suwa

UNITED STATES PATENT OFFICE.

MICHISUYE SUWA, OF TOKYO, JAPAN.

ELECTRIC BELL.

1,222,159. Specification of Letters Patent. Patented Apr. 10, 1917.

Application filed July 3, 1915. Serial No. 37,968.

*To all whom it may concern:*

Be it known that I, MICHISUYE SUWA, a subject of the Emperor of Japan, and a resident of the city of Tokyo, Japan, have invented new and useful Improvements in Electric Bells, of which the following is a specification.

This invention relates to improvements in electric bells and it resides mainly in a novel arrangement of the armature with respect to the poles of the electro-magnet forming part of the bell.

An object of the invention is to provide an electric magnet having pole-pieces which extend approximately longitudinally with respect to the axis of the electro-magnet, in contradistinction of known devices, wherein the pole shoes are located in transverse planes, with respect to the axis of the magnet or its core.

Another object of the invention is to provide a simple armature which consists of a straight strip of suitable metal supported so as to have its ends in opposition to opposite pole-pieces, the support for said armature being placed approximately midway between said poles, so that even at a slight oscillation of the armature the latter will come into contact with said poles, or will be removed therefrom.

Another object of the invention is to provide an electric bell in which one of the pole shoes extending approximately in direction of the longitudinal axis of the electro-magnet serves as a means for holding the support to which the armature is movably secured and for locating said armature with respect to said extension, so that the central portion of the armature normally remains in contact with the extension. The residuary magnetism remaining within the extension after the energization of the electro-magnet has ceased, is sufficiently large to cause attraction of the respective end of the armature to the said pole, even if a very weak current only is sent through the winding of the electro-magnet, whereby the useful life of batteries in connection with this electric bell is lengthened.

An object of the invention is also to provide an electric bell in which both of the poles of the electro-magnet are utilized to influence directly the armature, in contradistinction of known bells, in which the armature is placed immediately in front of one of the poles only, and is influenced therefore by the said pole exclusively.

With these and other objects in view I have illustrated several embodiments of the invention in the accompanying drawings, wherein—

The bell comprises a baseboard 8 having terminal screws near the upper edge of the same and a bell 9 mounted on a stud at a suitable distance from the surface of the baseboard near the lower end. An electromagnet 3, comprising a winding and a magnetizable core, is mounted on the board. Pole plates at the ends of the core extend transversely with respect to the longitudinal axis of the same, and the ends of said plates are bent, so as to form angular extensions 4, located in different planes which are parallel to the longitudinal axis of the core.

Figure 1:
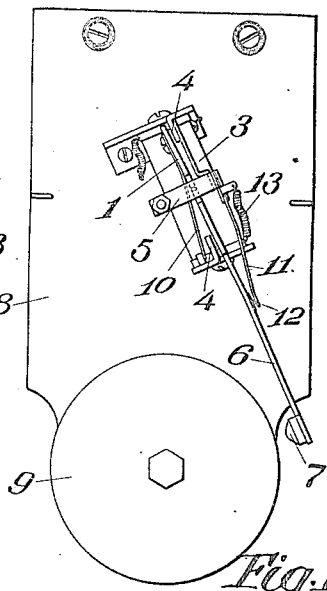
Figure 1 is a front elevation of an electric bell of this character.
Figure 7:
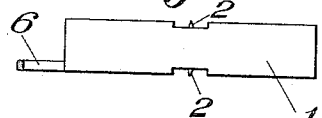
Fig. 7 is a plan detailed view of the armature used in connection with this bell.
Figure 3:
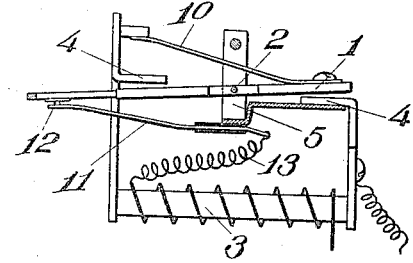
Fig. 3 is a diagrammatic view for illustrating the electrical connections as well as the mechanical means for suspending the armature.

The armature 1, consisting, as shown in Fig. 7, of a strip of metal, has supporting pins 2 near the central portion, and this armature is held in a hoop or bail-shaped member 5 which is supported by a screw, or in some other suitable way, on the baseboard of the bell. From Figs. 1 and 3 it will be seen that the armature 1 is arranged with respect to the angular extensions 4 of the pole shoes so that one end of the armature is located in opposition to that surface of a polar extension 4 which is directed away from the electro-magnet 3, while the other end is in opposition to that polar surface 4 which is directed toward the electro-magnet 3. While the armature may oscillate freely on its pivotal points 2 within the supporting strip 5, it is obvious that this oscillation is limited in either direction by the contact of the armature with the polar extensions of the pole shoes.

A rod 6 fastened to one end of the armature carries at its free end the hammer 7, which is adapted to strike the bell 9 when the armature is attracted by the pole shoes. This rod 6 also carries intermediate its ends a platinum plate adapted to contact with the platinum point 12 of the spring 11 when the armature is in its normal position at a distance from the pole extensions 4. To the opposite end of the armature 1 the end of a spring 10 is fastened, the other end of which is attached to the opposite polar extension. The spring 11, which is insulated from the other metal parts of the device, is connected by means of the conductor 13 with the winding of the electro-magnet. The operation, therefore, is approximately as follows:—

In its normal position the armature 1 is at a distance from both of the pole extensions 4 and makes contact with the point 12 of the spring 11. When a circuit is closed through the bell, the current passes through the winding of the electro-magnet into the conductor 13, through the spring 11, contact point 12, armature 1, spring 10, pole 4, core of the electro-magnet, and through a wire indicated in connection with one of the polar extensions, back to the battery (not shown). The energization of the electro-magnet will cause both of the poles to attract the respective ends of the armature, so that the hammer 7 strikes the bell. This attraction also causes the removal of the contact plate of the armature from the contact point 12, and the interruption of the current. The armature, therefore, will be returned to its normal position by the spring 10, whereby the current is closed again at the contact point 12. The armature is again attracted and so on until the current through the winding of the electro-magnet 3 is interrupted.

Figure 4:
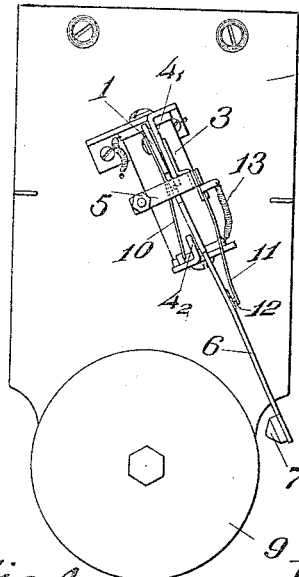
Fig. 4 is a front elevation of a modified electric bell of this character.
Figure 2:
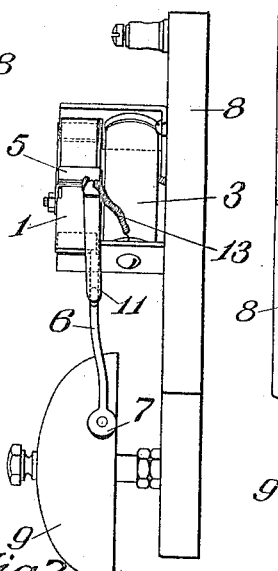
Fig. 2 is a side elevation of the same.
Figure 5:
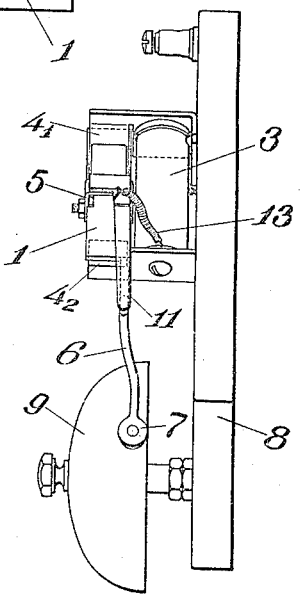
Fig. 5 is a side elevation of the modified embodiment shown in Fig. 4.
Figure 6:
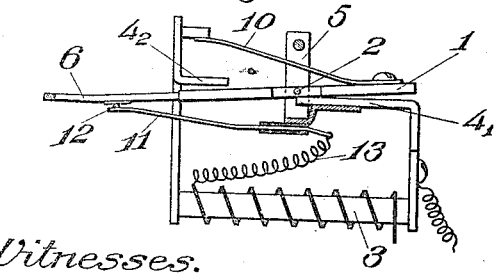
Fig. 6 is a diagrammatic view similar to Fig. 3 to illustrate the modified embodiment.

While in the embodiment described the angular extensions 4 of the pole shoes have about the same length, it will be noted with respect to the embodiment illustrated in Figs. 4 to 6 that one polar extension 4' is made considerably longer than the polar extension 4² projecting from the other pole shoe of the magnetic core. The end of the extension 4' is always kept in contact with a surface point of the armature, even though the armature may oscillate away from the other end or operative portion of the same angular extension. The result of this arrangement will be that not only large surfaces of pole shoe and armature are brought into contact with each other, but also that on account of the permanent contact of the end of the angular extension with a point located between the poles of the armature, a slight pull exerted by the angular extension 4' on the armature will be sufficient to cause oscillation of the armature. This means that even weakened batteries which, under normal conditions, would have indicated a state of exhaustion beyond usefulness may be utilized for the operation of the bell.

I claim:

1. In an electric bell, an electro-magnet, a core, pole shoes on said core, said pole shoes being provided with angular extensions located in planes parallel to the axis of the core, and an armature oscillatorily mounted intermediate its ends, the ends of said armature being adapted to engage with opposite sides said angular polar extensions.

2. In an electric bell, the combination with an electro-magnet of a core, polar projections on said core bent in direction toward each other and located in planes parallel to the longitudinal axis of the core, one of said polar projections being longer than the other polar projection, and an armature oscillatably mounted between said polar projections, opposite ends of said armature being each in opposition to one of said polar projections, the center portion of said armature being in constant contact with the said longer polar projection.

3. In an electric bell, the combination of an electro-magnet, a core, polar projections on the core, bent portions on the polar projections extending toward each other in different planes parallel to the longitudinal axis of the core, and an armature comprising a straight strip of metal having supporting pins near its center portion, the ends of the armature to engage with opposite sides of the bent portions, one of said bent portions being in continuous contact with the center portion of the armature.

In witness whereof I have signed this specification in presence of two witnesses.

MICHISUYE SUWA.

Witnesses:
 DEN KIDO,
 EISHIRO ABE.

Copies of this patent may be obtained for five cents each, by addressing the "Commissioner of Patents, Washington, D. C."